United States Patent
Danknick

(10) Patent No.: US 12,225,433 B2
(45) Date of Patent: *Feb. 11, 2025

(54) TRACKING DEVICE FUNCTIONALITY RESTRICTION IN A LOST CONTEXT

(71) Applicant: Tile, Inc., San Mateo, CA (US)

(72) Inventor: Dan Danknick, Prescott, AZ (US)

(73) Assignee: Tile, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/622,731

(22) Filed: Mar. 29, 2024

(65) Prior Publication Data

US 2024/0244398 A1 Jul. 18, 2024

Related U.S. Application Data

(63) Continuation of application No. 17/540,073, filed on Dec. 1, 2021, now Pat. No. 11,974,190, which is a
(Continued)

(51) Int. Cl.
*H04W 4/029* (2018.01)
*H04L 67/50* (2022.01)
(Continued)

(52) U.S. Cl.
CPC ............ *H04W 4/029* (2018.02); *H04L 67/52* (2022.05); *H04L 67/535* (2022.05);
(Continued)

(58) Field of Classification Search
CPC ......... H04W 4/029; H04W 4/80; H04W 4/02; H04W 4/023; H04W 4/021; H04W 8/005;
(Continued)

(56) References Cited

U.S. PATENT DOCUMENTS

| | | |
|---|---|---|
| 7,257,374 B1 | 8/2007 | Creigh |
| 7,639,131 B2 | 12/2009 | Mock et al. |

(Continued)

FOREIGN PATENT DOCUMENTS

| | | | | |
|---|---|---|---|---|
| CN | 111010679 A | * | 4/2020 | ............. H04W 4/30 |
| EP | 4184957 A1 | * | 5/2023 | ....... G06K 19/06037 |
| WO | WO-2021126669 A1 | * | 6/2021 | ............. G06F 21/88 |

OTHER PUBLICATIONS

Extended European Search Report, European Patent Application No. EP18898003, Nov. 5, 2020, 9 pages.
(Continued)

*Primary Examiner* — Matthew C Sams
(74) *Attorney, Agent, or Firm* — Fenwick & West LLP

(57) ABSTRACT

One or more features of a tracking device can be disabled if the tracking device is lost. A tracking device is associated with a first mobile device, which can remotely control the tracking device via a tracking server. The tracking server receives an instruction from the first mobile device to disable a feature of the tracking device. The tracking server also receives a notification from a second mobile device that the second mobile device is within a communication range of the tracking device. In response to receiving the instruction and the notification, the tracking server transmits the instruction for the tracking device to disable the feature to the second mobile device. The tracking device receives the instruction to disable the feature from the second mobile device. In response to receiving the instruction to disable the feature, the tracking device disables the feature according to the instruction.

18 Claims, 9 Drawing Sheets

Related U.S. Application Data continuation of application No. 16/515,523, filed on Jul. 18, 2019, now Pat. No. 11,223,927, which is a continuation of application No. 15/862,491, filed on Jan. 4, 2018, now Pat. No. 10,405,144.

(51) Int. Cl.

| | | |
|---|---|---|
| *H04L 67/52* | (2022.01) | |
| *H04M 1/72412* | (2021.01) | |
| *H04M 1/72415* | (2021.01) | |
| *H04W 4/02* | (2018.01) | |
| *H04W 4/021* | (2018.01) | |
| *H04W 4/80* | (2018.01) | |
| *H04W 12/37* | (2021.01) | |
| *H04W 12/63* | (2021.01) | |

(52) U.S. Cl.
CPC .............. *H04M 1/72412* (2021.01); *H04M 1/72415* (2021.01); *H04W 4/021* (2013.01); *H04W 4/023* (2013.01); *H04W 4/80* (2018.02); *H04W 12/37* (2021.01); *H04W 12/63* (2021.01)

(58) Field of Classification Search
CPC ......... H04W 12/63; H04W 4/70; H04W 4/20; G08B 21/24; G08B 21/0269; G08B 13/1427; G08B 21/0277; G08B 13/2462; G08B 21/0272; H04L 67/52; H04L 67/10; H04L 67/535; H04L 67/12; H04M 1/72412; H04M 1/72457; H04M 1/72415; G06F 21/88; G06F 2221/2111; G01S 5/0295; G01S 5/0027; G01S 5/02; G01S 19/16; G01S 1/68
See application file for complete search history.

(56) References Cited

U.S. PATENT DOCUMENTS

| | | | |
|---|---|---|---|
| 7,705,728 B2 | 4/2010 | Mock et al. | |
| 9,374,666 B1 | 6/2016 | Trouw et al. | |
| 9,525,969 B2 | 12/2016 | Evans et al. | |
| 9,525,971 B1 | 12/2016 | Vega et al. | |
| 9,685,066 B2 | 6/2017 | Vega et al. | |
| 9,763,097 B2 * | 9/2017 | Robinson | H04W 12/08 |
| 9,821,766 B2 | 11/2017 | Gaskin | |
| 9,894,480 B2 | 2/2018 | Chapiewski et al. | |
| 9,922,531 B1 | 3/2018 | Doxey et al. | |
| 10,008,097 B1 | 6/2018 | Kumar et al. | |
| 10,015,839 B1 | 7/2018 | Depew | |
| 10,021,516 B2 | 7/2018 | Farley et al. | |
| 10,271,168 B2 | 4/2019 | Chapiewski et al. | |
| 10,405,144 B2 * | 9/2019 | Danknick | H04W 4/023 |
| 10,575,138 B1 * | 2/2020 | Klinkner | G08B 21/24 |
| 11,223,927 B2 * | 1/2022 | Danknick | H04W 12/126 |
| 11,470,447 B2 * | 10/2022 | Haines | H04W 4/80 |
| 11,800,326 B2 * | 10/2023 | Haines | H04W 4/029 |
| 11,974,190 B2 * | 4/2024 | Danknick | H04W 4/80 |
| 2005/0090267 A1 | 4/2005 | Kotzin | |
| 2009/0253406 A1 * | 10/2009 | Fitzgerald | H04W 12/082 455/410 |
| 2012/0237908 A1 * | 9/2012 | Fitzgerald | H04W 4/02 434/236 |
| 2014/0026128 A1 * | 1/2014 | Rocha De la hoz | G06F 40/106 715/202 |
| 2014/0136411 A1 * | 5/2014 | Cho | G06Q 20/3224 705/44 |
| 2014/0323115 A1 * | 10/2014 | Bennett | H04W 12/02 455/418 |
| 2015/0296477 A1 | 10/2015 | Pan et al. | |
| 2015/0356861 A1 | 12/2015 | Daoura et al. | |
| 2016/0105764 A1 | 4/2016 | Evans et al. | |
| 2016/0105766 A1 | 4/2016 | de la Broise | |
| 2016/0182170 A1 * | 6/2016 | Daoura | H04W 12/033 455/3.01 |
| 2017/0064511 A1 | 3/2017 | McCormick | |
| 2017/0105100 A1 * | 4/2017 | Farley | H04W 4/029 |
| 2017/0164156 A1 | 6/2017 | Evans et al. | |
| 2017/0289333 A1 | 10/2017 | Pai et al. | |
| 2017/0352250 A1 | 12/2017 | de Barros Chapiewski et al. | |
| 2018/0184286 A1 | 6/2018 | Patterson | |
| 2019/0014206 A1 | 1/2019 | Kuhn et al. | |
| 2019/0053003 A1 | 2/2019 | Cheunq et al. | |
| 2020/0329345 A1 * | 10/2020 | Haines | H04L 67/14 |
| 2023/0058680 A1 * | 2/2023 | Haines | H04W 4/029 |

OTHER PUBLICATIONS

International Search Report and Written Opinion, PCT Application No. PCT/US2018/065148, Apr. 25, 2019, 12 pages.
United States Office Action, U.S. Appl. No. 15/862,491, filed Dec. 21, 2018, 21 pages.
United States Office Action, U.S. Appl. No. 17/540,073, filed Dec. 15, 2023, eight pages.
United States Office Action, U.S. Appl. No. 16/515,523, filed Jul. 6, 2021, 21 pages.
United States Office Action, U.S. Appl. No. 16/515,523, filed Dec. 22, 2020, 21 pages.
United States Office Action, U.S. Appl. No. 16/515,523, filed Oct. 8, 2020, 20 pages.
United States Office Action, U.S. Appl. No. 16/515,523, filed Jun. 18, 2020, 17 pages.
United States Office Action, U.S. Appl. No. 16/515,523, filed Apr. 20, 2020, 21 pages.
United States Office Action, U.S. Appl. No. 16/515,523, filed Jan. 30, 2020, 17 pages.

* cited by examiner

TRACKING DEVICE FUNCTIONALITY RESTRICTION IN A LOST CONTEXT

CROSS REFERENCE TO RELATED APPLICATIONS

This application is a continuation of U.S. application Ser. No. 17/540,073, filed Dec. 1, 2021, now U.S. Pat. No. 11,974,190, which application is a continuation of U.S. application Ser. No. 16/515,523, filed Jul. 18, 2019, now U.S. Pat. No. 11,223,927, which is a continuation of U.S. application Ser. No. 15/862,491, filed Jan. 4, 2018, now U.S. Pat. No. 10,405,144, all of which are incorporated by reference in their entirety.

BACKGROUND

This disclosure relates generally to tracking devices, and more specifically, to restricting the functionality of a tracking device or a device connected to the tracking device when the tracking device is lost.

Electronic tracking devices have created numerous ways for people to track the locations of people and/or objects. For example, a user can use GPS technology to track a device remotely or determine a location of the user. In another example, a user can attach a tracking device to an important object, such as keys or a wallet, and use the features of the tracking device to more quickly locate the object, (e.g., if it becomes lost). If the object is lost, the object will still be able to function; for example, if a user loses a set of headphones or another type of electronic device, a person who comes across the lost headphones or steals the headphones could use them. If the object were disabled, this may help discourage theft.

DETAILED DESCRIPTION

Environment Overview

Figure 1:
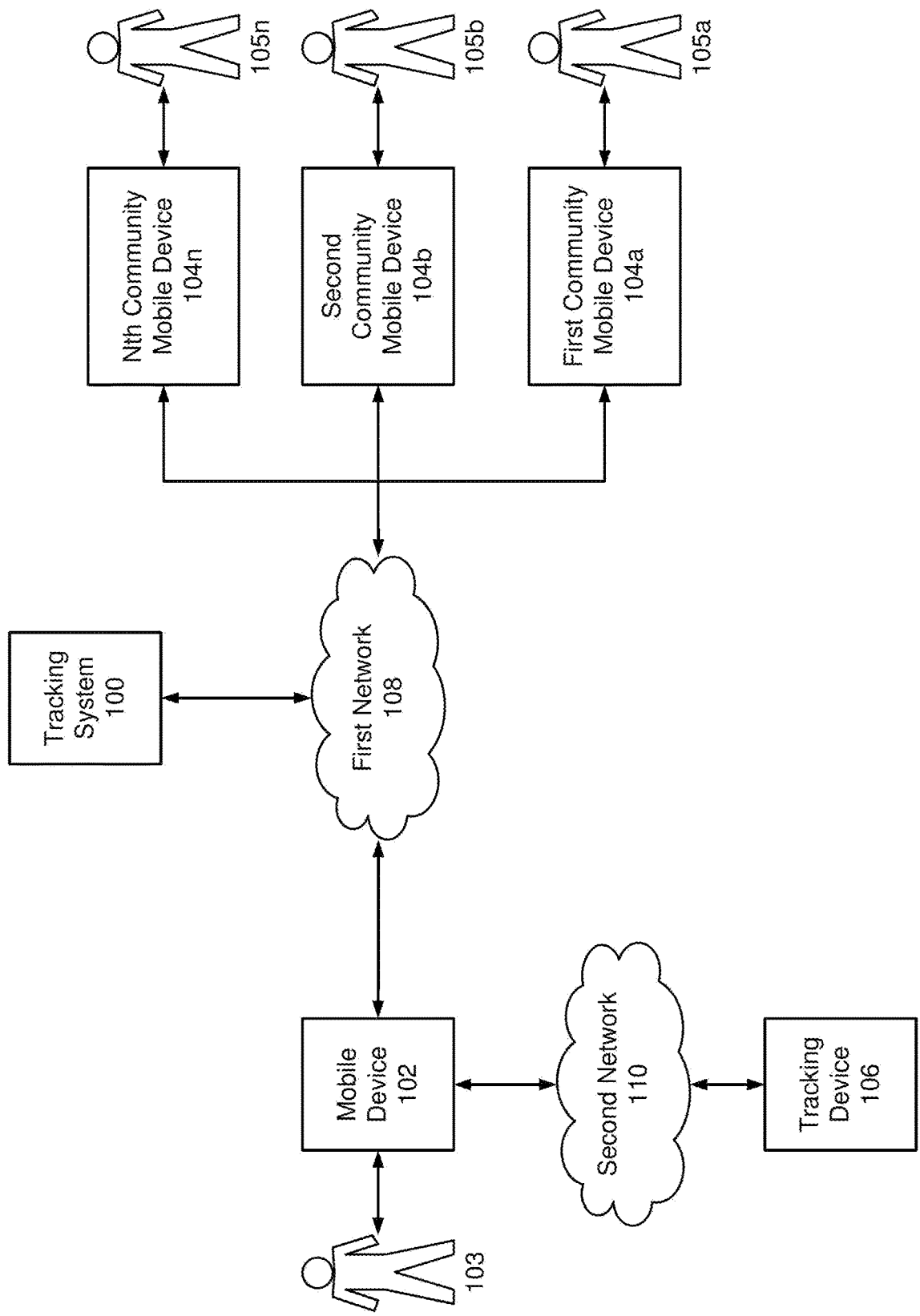
FIG. 1 illustrates an example tracking system environment in which a tracking device can operate, according to one embodiment.

Embodiments described herein detail functionality associated with a tracking device. A user can attach a tracking device to or enclose the tracking device within an object, such as a wallet, keys, a car, a bike, a pet, or any other object that the user wants to track. Or, a tracking device can be a device with a primary purpose unrelated to tracking functionality (e.g., a set of headphones, an electronic key, a wireless speaker, a fitness tracker, a camera) that has an integrated tracking component that allows the device to be tracked. The user can then use a mobile device (e.g., by way of a software application installed on the mobile device) or other device or service to track the tracking device. For example, the mobile device can perform a local search for a tracking device. However, in situations where the user is unable to locate the tracking device using their own mobile device (e.g., if the tracking device is beyond a distance within which the mobile device and the tracking device can communicate), the user can leverage the capabilities of a community of users of a tracking device system. In such situations, the user may designate the tracking device as "lost" and request that some functionality of the tracking device be disabled. For example, if the tracking device has a tracking component and a different primary device function (e.g., playing sound if the tracking device is a wireless speaker), the primary device function can be disabled to render the tracking device unusable to a potential thief. While this primary function is disabled, the tracking component can remain enabled, allowing the user to locate the lost tracking device. As another example, if the tracking device is attached to another object, the user can disable the tracking device to prevent a potential thief from taking the tracking device and repurposing it (e.g., to track an object owned by the thief, or to sell to another potential user interested in tracking an object).

A tracking system (also referred to herein as a "cloud server," "tracking server," or simply "server") can maintain user profiles associated with a plurality of users of the tracking system. The tracking system can associate each user within the system with one or more tracking devices associated the user (e.g., tracking devices that the user has purchased and is using to track objects owned by the user, or devices that include a tracking component and have additional non-tracking features). If the user's tracking device, or the object to which the tracking device is attached, becomes lost or stolen, the user can send an indication that the tracking device is lost to the tracking system, which is in communication with one or more mobile devices associated with the community of users in communication with the system. The tracking system can set a flag indicating the tracking device is lost. When one of a community of mobile devices that are scanning for nearby tracking devices and providing updated locations to the tracking system identifies a flagged tracking device, the tracking system can associate the received location with the flagged tracking device, and relay the location to a user of the tracking device, thereby enabling the user to locate the lost tracking device. In addition, the tracking system can transmit an instruction to the community mobile device to forward to the tracking device that will cause the tracking device to disable one or more features. This will limit the usefulness of the tracking device to another person if the tracking device has been stolen or is at risk of being stolen. As used herein, "mobile device" can refer to a phone, tablet computer, or other connected device, and can also refer to systems typically not consider mobile, such as servers, routers, gateways, access points, and specialized systems configured to couple to tracking devices and report a location of the tracking devices.

As used herein, "tracking device" can refer to any device configured to communicate with another device for the purpose of locating the tracking device. Tracking devices can be specialized or single-purpose devices (e.g., self-contained devices that include circuitry or components to communicate with another device). However, "tracking device" as used herein can also refer to device or object with a different primary function but with secondary tracking device functionality. For example, a wireless speaker can include tracking device components that allow a user to track and/or locate the wireless speaker. In some embodiments, a tracking device platform can be established such that devices and objects that satisfy one or more criteria can act as tracking devices within a tracking device ecosystem. For instance, a tracking device provider can provide an SDK or custom chipset that, when incorporated into an object or device, enable the object or device to function as tracking devices, to communicate with other devices within the tracking device ecosystem, and to implement the functionalities described herein.

FIG. 1 illustrates an example tracking system environment in which a tracking device can operate, according to one embodiment. The environment of FIG. 1 includes a tracking system 100 communicatively coupled to a mobile device 102 associated with the user 103 via a first network 108. The tracking system 100 is also communicatively coupled to a plurality of community mobile devices 104a through 104n (collectively referred to herein as "community mobile devices 104") associated with a plurality of users 105a through 105n of the tracking system 100 (collectively referred to herein as "community users 105") via the first network 108. As will be explained in more detail below, the tracking system 100 can allow the user 103 to manage and/or locate a tracking device 106 associated with the user 103. In some embodiments, the tracking system 100 leverages the capabilities of community mobile devices 104 to locate the tracking device 106 if the location of the tracking device is unknown to the user 103 and beyond the capabilities of mobile device 102 to track. In some configurations, the user 103 may own and register multiple tracking devices 106. Although FIG. 1 illustrates a particular arrangement of the tracking system 100, mobile device 102, community mobile devices 104, and tracking device 106, various additional arrangements are possible.

In some configurations, the user 103 may be part of the community of users 105. Further, one or more users 105 may own and register one or more tracking devices 106. Thus, any one of the users within the community of users 105 can communicate with tracking system 100 and leverage the capabilities of the community of users 105 in addition to the user 103 to locate a tracking device 106 that has been lost.

The tracking system 100, mobile device 102, and plurality of community mobile devices 104 may communicate using any communication platforms and technologies suitable for transporting data and/or communication signals, including known communication technologies, devices, media, and protocols supportive of remote data communications.

In certain embodiments, the tracking system 100, mobile device 102, and community mobile devices 104 may communicate via a first network 108, which may include one or more networks, including, but not limited to, wireless networks (e.g., wireless communication networks), mobile telephone networks (e.g., cellular telephone networks), closed communication networks, open communication networks, satellite networks, navigation networks, broadband networks, narrowband networks, the Internet, local area networks, and any other networks capable of carrying data and/or communications signals between the tracking system 100, mobile device 102, and community mobile devices 104. The mobile device 102 and community of mobile devices 104 may also be in communication with a tracking device 106 via a second network 110. The second network 110 may be a similar or different type of network as the first network 108. In some embodiments, the second network 110 comprises a wireless network with a limited communication range, such as a Bluetooth or Bluetooth Low Energy (BLE) wireless network. In some configurations, the second network 110 is a point-to-point network including the tracking device 106 and one or more mobile devices that fall within a proximity of the tracking device 106. In such embodiments, the mobile device 102 and community mobile devices 104 may only be able to communicate with the tracking device 106 if they are within a close proximity to the tracking device, though in other embodiments, the tracking device can use long-distance communication functionality (for instance, a GSM transceiver) to communicate with either a mobile device 102/104 or the tracking system 100 at any distance. In some configurations, the mobile device 102 and one or more community mobile devices 104 may each be associated with multiple tracking devices associated with various users.

As mentioned above, FIG. 1 illustrates the mobile device 102 associated with the user 103. The mobile device 102 can be configured to perform one or more functions described herein with respect to locating tracking devices (e.g., tracking device 106). For example, the mobile device 102 can receive input from the user 103 representative of information about the user 103 and information about a tracking device 106. The mobile device 102 may then provide the received user information, tracking device information, and/or information about the mobile device 102 to the tracking system 100. Accordingly, the tracking system 100 is able to associate the mobile device 102, the user 103, and/or the tracking device 106 with one another. In some embodiments, the mobile device 102 can communicate with the tracking device 106 and provide information regarding the location of the tracking device to the user 103. For example, the mobile device 102 can detect a communication signal from the tracking device 106 (e.g., by way of second network 110) as well as a strength of the communication signal or other measure of proximity to determine an approximate distance between the mobile device 102 and the tracking device 106. The mobile device 102 can then provide this information to the user 103 (e.g., by way of one or more graphical user interfaces) to assist the user 103 to locate the tracking device 106. Accordingly, the user 103 can use the mobile device 102 to track and locate the tracking device 106 and a corresponding object associated with the tracking device 106. If the mobile device 102 is located beyond the immediate range of communication with the tracking device 106 (e.g., beyond the second network 110), the mobile device 102 can be configured to send an indication that a tracking device 106 is lost to the tracking system 100, requesting assistance in finding the tracking device. The mobile device 102 can send an indication of a lost device in response to a command from the user 103. For example, once the user 103 has determined that the tracking device 106 is lost, the user can provide user input to the mobile device 102 (e.g., by way of a graphical user interface), requesting that the mobile device 102 send an indication that the tracking device 106 is lost to the tracking system 100. In some examples, the lost indication can include information identifying the user 103 (e.g., name, username, authentication information), information associated with the mobile device 102 (e.g., a mobile phone number), information associated with the tracking device (e.g., a unique tracking device identifier), or a location of the user (e.g., a GPS location of the mobile device 102 at the time the request is sent). In some embodiments, the lost indication can include an instruction to disable a feature of the tracking device, as described in detail with respect to FIGS. 6-9.

The tracking system 100 can be configured to provide a number of features and services associated with the tracking and management of a plurality of tracking devices and/or users associated with the tracking devices. For example, the tracking system 100 can manage information and/or user profiles associated with user 103 and community users 105. In particular, the tracking system 100 can manage information associated with the tracking device 106 and/or other tracking devices associated with the user 103 and/or the community users 105.

As mentioned above, the tracking system 100 can receive an indication that the tracking device 106 is lost from the mobile device 102. The tracking system 100 can then process the indication in order to help the user 103 find the tracking device 106. For example, the tracking system 100 can leverage the capabilities of the community mobile devices 104 to help find the tracking device 106. In particular, the tracking system 100 may set a flag for a tracking device 106 to indicate that the tracking device 106 lost and monitor communications received from the community mobile devices 104 indicating the location of one or more tracking devices 106 within proximity of the community mobile devices 104. The tracking system 100 can determine whether a specific location is associated with the lost tracking device 106 and provide any location updates associated with the tracking device 106 to the mobile device 102. In one example, the tracking system may receive constant updates of tracking device 106 locations regardless of whether a tracking device 106 is lost and provide a most recent updated location of the tracking device 106 in response to receiving an indication that the tracking device 106 is lost.

In some configurations, the tracking system 100 can send a location request associated with the tracking device 106 to each of the community mobile devices 104. The location request can include any instructions and/or information necessary for the community mobile devices 106 to find the tracking device 102. For example, the location request can include a unique identifier associated with the tracking device 106 that can be used by the community mobile devices 104 to identify the tracking device 106. Accordingly, if one of the community mobile devices 104 detects a communication from the tracking device 106 (e.g., if the community mobile device 104 is within range or moves within range of the communication capabilities of the tracking device 106 and receives a signal from the tracking device 106 including or associated with the unique identifier associated with the tracking device 106), the community mobile device 104 can inform the tracking system 100. Using the information received from the community mobile devices 104, the tracking system 100 can inform the user (e.g., by way of the mobile device 102) of a potential location of the tracking device 106.

As shown in FIG. 1 and as mentioned above, the tracking system 100 can communicate with a plurality of community mobile devices 104 associated with corresponding community users 105. For example, an implementation may include a first community mobile device 104a associated with a first community user 105a, a second community mobile device 104b associated with a second community user 105b, and additional communication mobile devices associated with additional community users up to an nth community mobile device 104n associated with an nth community user 105n. The community mobile devices 104 may also include functionality that enables each community mobile device 104 to identify a tracking device 106 within a proximity of the community mobile device 104. In one example, a first community mobile device 104a within proximity of a tracking device 106 can communicate with the tracking device 106, identify the tracking device 106 (e.g., using a unique identifier associated with the tracking device 106), and/or detect a location associated with the tracking device 106 (e.g., a location of the first mobile community device 104a at the time of the communication with the tracking device 106). This information can be used to provide updated locations and/or respond to a location request from the tracking system 100 regarding the tracking device 106. In some embodiments, the steps performed by the first community mobile device 104a can be hidden from the first community user 105a. Accordingly, the first community mobile device 104a can assist in locating the tracking device 106 without bother and without the knowledge of the first community user 105a.

As mentioned above, the tracking system 100 can assist a user 103 in locating a tracking device 106. The tracking device may be a chip, tile, tag, or other device for housing circuitry and that may be attached to or enclosed within an object such as a wallet, keys, purse, car, or other object that the user 103 may track. Additionally, the tracking device 106 may include a speaker for emitting a sound and/or a transmitter for broadcasting a beacon. In one configuration, the tracking device 106 may periodically transmit a beacon signal that may be detected using a nearby mobile device 102 and/or community mobile device 104. In some configurations, the tracking device 106 broadcasts a beacon at regular intervals (e.g., one second intervals) that may be detected from a nearby mobile device (e.g., community mobile device 104). The strength of the signal emitted from the tracking device 106 may be used to determine a degree of proximity to the mobile device 102 or community mobile device 104 that detects the signal. For example, a higher strength signal would indicate a close proximity between the tracking device 106 and the mobile device 102 and a lower strength signal would indicate a more remote proximity between the tracking device 106 and the mobile device 102, though in some embodiments, the tracking device 106 can intentionally vary the transmission strength of the beacon signal. In some cases, the strength of signal or absence of a signal may be used to indicate that a tracking device 106 is lost.

System Overview

Figure 2:
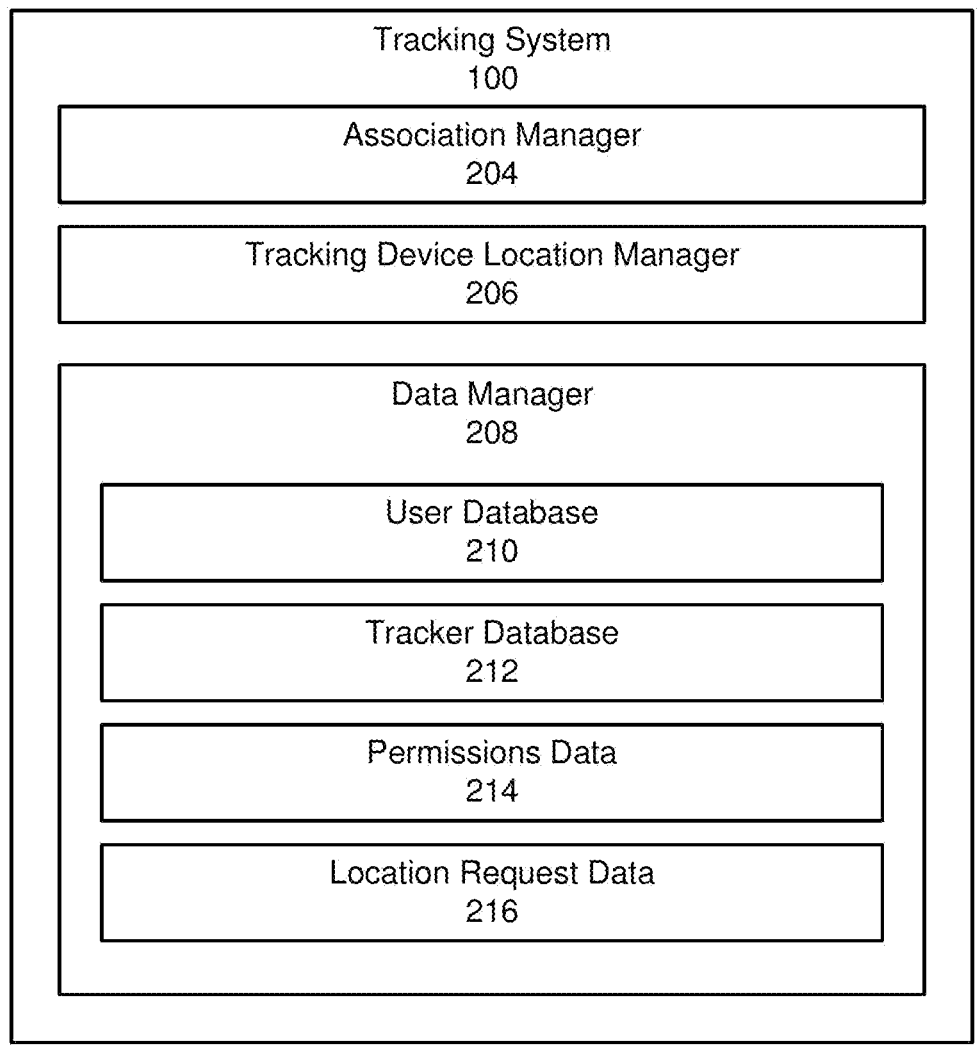
FIG. 2 illustrates an example tracking system for use in a tracking system environment, according to one embodiment.

FIG. 2 illustrates an example tracking system for use in a tracking system environment, according to one embodiment. As shown, the tracking system 100 may include, but is not limited to, an association manager 204, a tracking device location manager 206, and a data manager 208, each of which may be in communication with one another using any suitable communication technologies. It will be recognized that although managers 204-208 are shown to be separate in FIG. 2, any of the managers 204-208 may be combined into fewer managers, such as into a single manager, or divided into more managers as may serve a particular embodiment.

The association manager 204 may be configured to receive, transmit, obtain, and/or update information about a user 103 and/or information about one or more specific tracking devices (e.g., tracking device 106). In some configurations, the association manager 204 may associate information associated with a user 103 with information associated with a tracking device 106. For example, user information and tracking information may be obtained by way of a mobile device 102, and the association manager 204 may be used to link the user information and tracking information. The association between user 103 and tracking device 106 may be used for authentication purposes, or for storing user information, tracking device information, permissions, or other information about a user 103 and/or tracking device 106 in a database.

The tracking system 100 also includes a tracking device location manager 206. The tracking device location manager 206 may receive and process an indication that the tracking device 106 is lost from a mobile device (e.g., mobile device 102 or community mobile devices 104). For example, the tracking system 100 may receive a lost indication from a mobile device 102 indicating that the tracking device 106 is lost. The tracking device location manager 206 may set a flag on a database (e.g., tracker database 212) indicating that the tracking device 106 is lost. The tracking device location manager 206 may also query a database to determine tracking information corresponding to the associated user 103 and/or tracking device 106. The tracking system 100 may obtain tracking device information and provide the tracking device information or other information associated with the tracking device 106 to a plurality of community mobile devices 104 to be on alert for the lost or unavailable tracking device 106.

The tracking device location manager 206 may also receive a location from one or more community mobile devices 104 that detect the tracking device 106, for instance in response to the community mobile device receiving a beacon signal transmitted by the tracking device 106, without the tracking device 106 having been previously marked as lost. In such embodiments, a user corresponding to the mobile device 102 can request a most recent location associated with the tracking device from the tracking system 100, and the location manager 206 can provide the location received from the community mobile device for display by the mobile device 102. In some embodiments, the location manager 206 provides the location of the tracking device 106 received from a community mobile device either automatically (for instance if the tracking device 106 is marked as lost) or at the request of a user of the mobile device 102 (for instance, via an application on the mobile device 102). The location manager 206 can provide a location of a tracking device 106 to a mobile device 102 via a text message, push notification, application notification, automated voice message, or any other suitable form of communication.

The tracking device location manager 206 may further manage providing indications about whether a tracking device 106 is lost or not lost. For example, as discussed above, the tracking device location manager 206 may provide a location request to the community of mobile devices 104 indicating that a tracking device 106 is lost. Additionally, upon location of the tracking device 106 by the user 103 or by one of the community of users 105, the tracking device location manager 206 may provide an indication to the user 103, community user 105, or tracking system 100 that the tracking device 106 has been found, thus removing any flags associated with a tracking device and/or canceling any location request previously provided to the community of users 105. For example, where a user 103 sends an indication that the tracking device 106 is lost to the tracking system 100 and later finds the tracking device 106, the mobile device 102 may provide an indication to the tracking system 100 that the tracking device 106 has been found. In response, the tracking device location manager 206 may remove a flag indicating that the tracking device 106 is lost and/or provide an updated indication to the community of users 105 that the tracking device 106 has been found, thus canceling any instructions associated with the previously provided location request. In some configurations, the notification that the tracking device 106 has been found may be provided automatically upon the mobile device 102 detecting the tracking device 106 within a proximity of the mobile device 102. Alternatively, the notification that the tracking device 106 has been found may be provided by the user 103 via user input on the mobile device 102. In another example, a known user (e.g., a friend or family member) with whom the tracking device 106 has been shared may provide an indication that the tracking device 106 has been found.

In some embodiments, the tracking device location manager 206 also receives and processes instructions to disable one or more features of a tracking device 106. A lost indication from a mobile device 102 indicating that the tracking device 106 is lost may be accompanied by an instruction to disable one or more features of the tracking device 106. The feature(s) to disable may be included in the instruction, or the tracking system 100 or tracking device 106 may store information indicating which feature(s) to disable in response to a disable instruction. In other embodiments, when the tracking device location manager 206 receives a lost indication for a tracking device, the tracking device location manager 206 looks up instructions associated with the tracking device 106, e.g., in the data manger 208, and forwards appropriate instructions for disabling a feature of the tracking device 106. Disabling features of lost tracking devices is described further with reference to FIGS. 6 through 9.

The tracking system 100 additionally includes a data manager 208. The data manager 208 may store and manage information associated with users, mobile devices, tracking devices, permissions, location requests, and other data that may be stored and/or maintained in a database related to performing location services of tracking devices. As shown, the data manager 208 may include, but is not limited to, a user database 210, a tracker database 212, permissions data 214, and location request data 216. It will be recognized that although databases and data within the data manager 208 are shown to be separate in FIG. 2, any of the user database 210, tracker database 212, permissions data 214, and location request data 216 may be combined in a single database or manager, or divided into more databases or managers as may serve a particular embodiment.

The data manager 208 may include the user database 210. The user database 210 may be used to store data related to various users. For example, the user database 210 may include data about the user 103 as well as data about each user 105 in a community of users 105. The community of users 105 may include any user that has provided user information to the tracking system 100 via a mobile device 102, 104 or other electronic device. The user information may be associated with one or more respective tracking devices 106, or may be stored without an association to a particular tracking device. For example, a community user 105 may provide user information and permit performance of tracking functions on the community mobile device 104 without owning or being associated with a tracking device 106. The user database 210 may also include information about one or more mobile devices or other electronic devices associated with a particular user.

The data manager 208 may also include a tracker database 212. The tracker database 212 may be used to store data related to tracking devices. For example, the tracker database 212 may include tracking data for any tracking device 106 that has been registered with the tracking system 100. Tracking data may include unique tracker identifications (IDs) associated with individual tracking devices 106. Tracker IDs may be associated with a respective user 103. Tracker IDs may also be associated with multiple users. Additionally, the tracker database 212 may include any flags or other indications associated with whether a specific tracking device 106 has been indicated as lost and whether any incoming communications with regard to that tracking device 106 should be processed based on the presence of a flag associated with the tracking device 106. The tracker database 212 may also include feature information about tracking devices 106, whether one or more features of a tracking device 106 should be disabled when lost, and whether one or more features of a tracking device 106 are currently disabled, or have been instructed to be disabled.

The data manager 208 may further include permissions data 214 and location request data 216. Permissions data 214 may include levels of permissions associated with a particular user 103 and/or tracking device 106. For example, permissions data 214 may include additional users that have been indicated as sharing a tracking device 106, or who have been given permission to locate or receive a location of a tracking device 106. Location request data 216 may include information related to a location request or a lost indication received from the user 103 via a mobile device 102.

Figure 3:
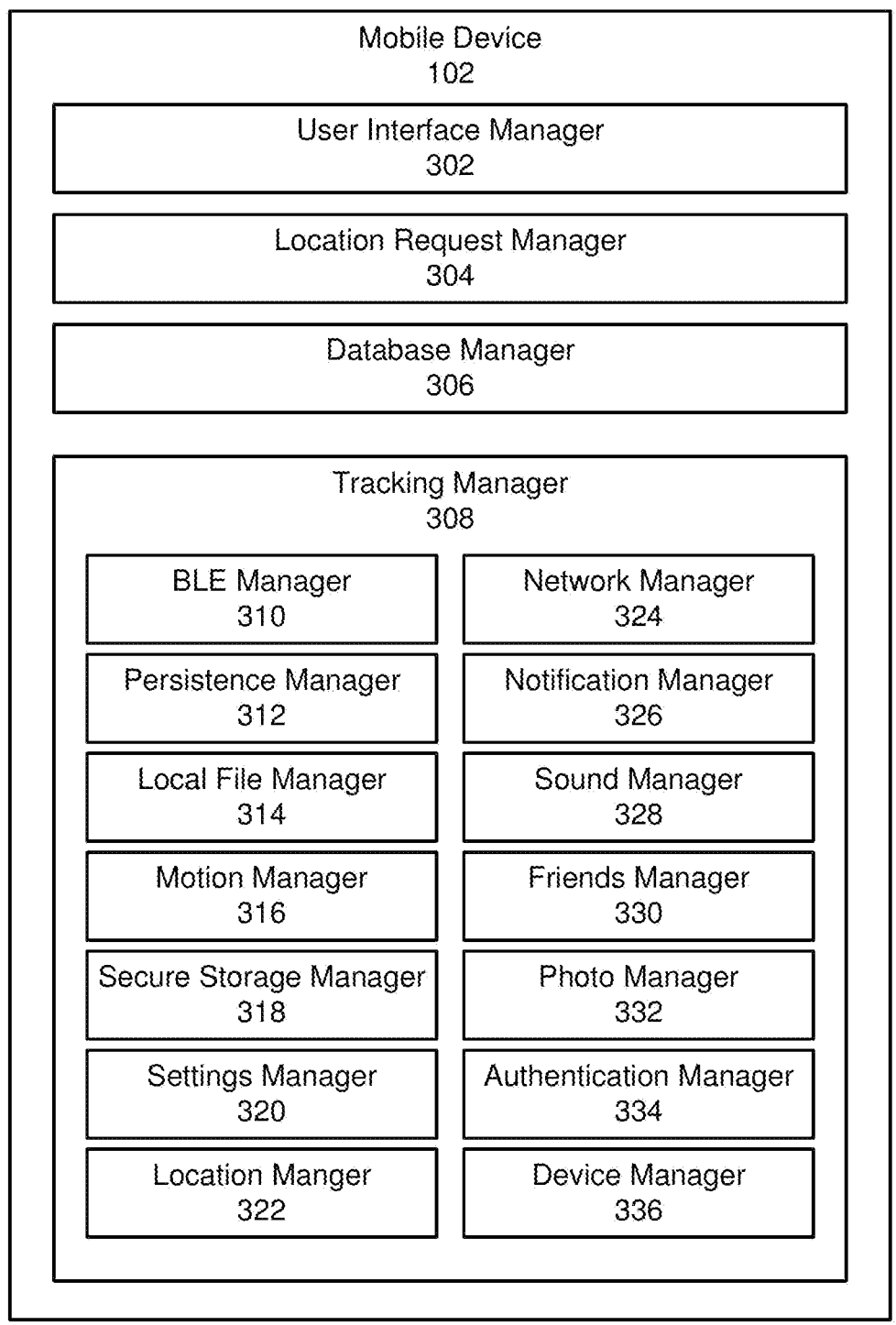
FIG. 3 illustrates an example user mobile device for use in a tracking system environment, according to one embodiment.

FIG. 3 illustrates an example user mobile device for use in a tracking system environment, according to one embodiment. As shown, the mobile device 102 may include, but is not limited to, a user interface manager 302, a location request manager 304, a database manager 306, and a tracking manager 308, each of which may be in communication with one another using any suitable communication technologies. It will be recognized that although managers 302-308 are shown to be separate in FIG. 3, any of the managers 302-308 may be combined into fewer managers, such as into a single manager, or divided into more managers as may serve a particular embodiment.

As will be explained in more detail below, the mobile device 102 includes the user interface manager 302. The user interface manager 302 may facilitate providing the user 103 access to data on a tracking system 100 and/or providing data to the tracking system 100. Further, the user interface manager 302 provides a user interface by which the user 103 may communicate with tracking system 100 and/or tracking device 106 via mobile device 102.

The mobile device 102 may also include a location request manager 304. The location request manager 304 may receive and process a request input to the mobile device 102 to send an indication that a tracking device 106 is lost to a tracking system 100. For example, the user 103 may provide an indication that a tracking device 106 is lost, unreachable, or otherwise unavailable, and/or that one or more features of the tracking device 106 should be disabled, from the mobile device 102 via the user interface manager 302, and the location request manager 304 may process the lost indication and/or disabling instructions and provide any necessary data to the tracking system 100 for processing and relaying a location request and/or disabling instruction to other users 105 over a network 108. In some configurations, an indication that a tracking device 106 is lost is provided via user input. Alternatively, the indication may be transmitted automatically in response to the mobile device 102 determining that a tracking device 106 is lost.

In addition, the location request manager 304 can request a location of the tracking device 106 without the tracking device 106 being identified as lost. For instance, a user can access a tracking device location feature of an application running on the mobile device 102 (for example, via the user interface manager 302), and the location request manager 304 can request a most recent location of the tracking device 106 from the tracking system 100. The location request manager 304 can receive the most recent location from the tracking system 100, and can display the most recent location via the user interface manager 302.

The mobile device 102 may also include a database manager 306. The database manager 306 may maintain data related to the user 103, tracking device 106, permissions, or other data that may be used for locating a tracking device 106 and/or providing a request to a tracking system 100 for locating one or more tracking devices 106 associated with the user 103. Further, the database manager 306 may maintain any information that may be accessed using any other manager on the mobile device 102.

The mobile device 102 may further include a tracking manager 308. The tracking manager 308 may include a tracking application (e.g., a software application) for communicating with and locating a tracking device 106 associated with the user 103. For example, the tracking manager 308 may be one configuration of a tracking application installed on the mobile device 102 that provides the functionality for locating a tracking device 106 and/or requesting location of a tracking device 106 using a tracking system 100 and/or a plurality of community mobile devices 104. As shown, the tracking manager 308 may include, but is not limited to, a Bluetooth Low Energy (BLE) manager 310, a persistence manager 312, a local files manager 314, a motion manager 316, a secure storage manager 318, a settings manager 320, a location manager 322, a network manager 324, a notification manager 326, a sound manager 328, a friends manager 330, a photo manager 332, an authentication manager 334, and a device manager 336. Thus, the tracking manager 308 may perform any of the functions associated with managers 310-338, described in additional detail below.

The BLE manager 310 may be used to manage communication with one or more tracking devices 106. The persistence manager 312 may be used to store logical schema information that is relevant to the tracking manager 308. The local files manager 314 may be responsible for managing all files that are input or output from the mobile device 102. The motion manager 316 may be responsible for all motion management required by the tracking manager 308. The secure storage manager may be responsible for storage of secure data, including information such as passwords and private data that would be accessed through this sub-system. The settings manager 320 may be responsible for managing settings used by the tracking manager 308. Such settings may be user controlled (e.g., user settings) or defined by the tracking manager 308 for internal use (e.g., application settings) by a mobile device 102 and/or the tracking system 100. The location manager 322 may be responsible for all location tracking done by the tracking manager 308. For example, the location manager 322 may manage access to the location services of the mobile device 102 and works in conjunction with other managers to persist data. The network manager 324 may be responsible for all Internet communications from the tracking manager 308. For example, the network manager 324 may mediate all Internet API calls for the tracking manager 308. The notification manager 326 may be responsible for managing local and push notifications required by the tracking manager 308. The sound manager 328 may be responsible for playback of audio cues by the tracking manager 308. The friends manager 330 may be responsible for managing access to contacts and the user's social graph. The photo manager 332 may be responsible for capturing and managing photos used by the tracking manager 308. The authentication manager 334 may be responsible for handling the authentication (e.g., sign in or login) of users. The authentication manager 334 may also include registration (e.g., sign up) functionality. The authentication manager 334 further coordinates with other managers to achieve registration functionality. The device manager 336 may be responsible for managing the devices discovered by the tracking manager 308. The device manager 336 may further store and/or maintain the logic for algorithms related to device discovery and update.

Figure 4:
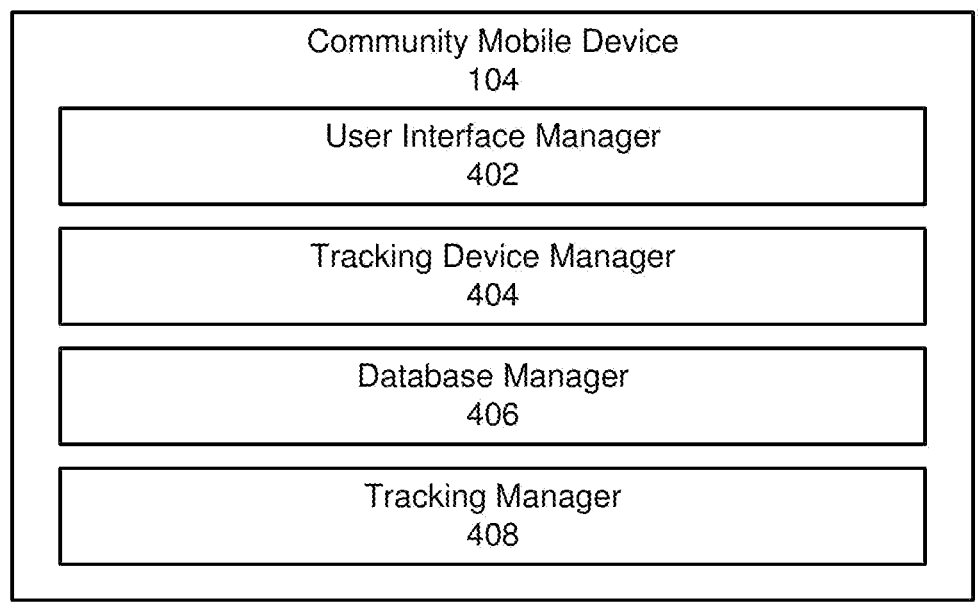
FIG. 4 illustrates an example community mobile device for use in a tracking system environment, according to one embodiment.

FIG. 4 illustrates an example community mobile device for use in a tracking system environment, according to one embodiment. As shown, the community mobile device 104 may include, but is not limited to, a user interface manager 402, a tracking device manager 404, a database manager 406, and a tracking manager 408, each of which may be in communication with one another using any suitable communication technologies. The user interface manager 402, database manager 406, and tracking manager 408 illustrated in FIG. 4 may include similar features and functionality as the user interface manager 302, database manager 306, and tracking manager 308 described above in connection with FIG. 3. It will be recognized that although managers 402-408 are shown to be separate in FIG. 4, any of the managers 402-408 may be combined into fewer managers, such as into a single manager, or divided into more managers as may serve a particular embodiment.

The community mobile device 104 may include a tracking device manager 404. The tracking device manager 404 may facilitate scanning for nearby tracking devices 106. In some configurations, the tracking device manager 404 can continuously or periodically scan (e.g., once per second) for nearby tracking devices 106. The tracking device manager 404 may determine whether to provide an updated location of the nearby tracking device 106 to the tracking system 100. In some configurations, the tracking device manager 404 provides a location of a nearby tracking device 106 automatically. Alternatively, the tracking device manager 404 may determine whether the location of the tracking device 106 has been recently updated, and may determine whether to provide an updated location based on the last time a location of the tracking device 106 has been updated (e.g., by the community mobile device 104). For example, where the community mobile device 104 has provided a recent update of the location of a tracking device 106, the tracking device manager 404 may decide to wait a predetermined period of time (e.g., 5 minutes) before providing an updated location of the same tracking device 106.

In one configuration, the tracking device manager 404 may receive and process a location request or other information relayed to the community mobile device 104 by the tracking system 100. For example, the tracking device manager 404 may receive an indication of a tracking device 106 that has been indicated as lost, and provide a location of the tracking device 106 if it comes within proximity of the community mobile device 104. In some configurations, the community mobile device 104 is constantly scanning nearby areas to determine if there is a tracking device 106 within a proximity of the community mobile device 104. Therefore, where a tracking device 106 that matches information provided by the tracking system 100 (e.g., from the location request) comes within proximity of the community mobile device 104, the tracking device manager 404 may generate and transmit a response to the location request to the tracking system 100, which may be provided to the user 103 associated with the tracking device 106. Further, generating and transmitting the response to the tracking request may be conditioned on the status of the tracking device 106 being flagged as lost by the mobile device 102 and/or the tracking system 100.

The tracking device manager 404 may also be used to relay instructions to the tracking device 106, e.g., instructions to disable a feature of the tracking device 106. In particular, the tracking system 100 may transmit instructions to the community mobile device 104 in response to receiving the response to the location request to the tracking system 100 from the community mobile device 104. The tracking device manager 404 in turn forwards the instructions to the tracking device 106, and in response to the instructions, the tracking device 106 disables a particular feature. The feature(s) to disable may be included in the instructions, or the tracking device 106 may store information regarding which feature(s) to disable in response to a generic disable instruction.

The tracking device manager 404 may additionally provide other information to the tracking system 100 in response to receiving the tracking request. For example, in addition to providing a location of the community mobile device 104, the tracking device manager may provide a signal strength associated with the location to indicate a level of proximity to the location of the community mobile device 104 provided to the user 103. For example, if a signal strength is high, the location provided to the user 103 is likely to be more accurate than a location accompanied by a low signal strength. This may provide additional information that the user 103 may find useful in determining the precise location of tracking device 106.

As described above, the tracking device manager 404 may determine whether to send a location within the proximity of the tracking device 106 to the tracking system 100. The determination of whether to send a location to the tracking system 100 may be based on a variety of factors. For example, a tracking device manager 404 may determine to send a location of the tracking device 106 to a tracking system 100 based on whether the detected tracking device 106 has been indicated as lost or if a tracking request has been provided to the community mobile device 104 for the particular tracking device 106. In some configurations, the community mobile device 104 may send an update of a location of a tracking device 106 even if the tracking device 106 is not associated with a current tracking request or if the tracking device 106 is not indicated as lost. For example, where the location of a tracking device 106 has not been updated for a predetermined period of time, the community mobile device 104 may provide an update of a tracking device location to the tracking system 100, regardless of whether a tracking request has been received.

In some configurations, the community mobile device 104 may include additional features. For example, the community mobile device 104 may allow a tracking system 100 to snap and download a photo using photo functionality of the community mobile device 104. In some configurations, this may be an opt-in feature by which a community user 105 permits a tracking system 100 to take a snap-shot and possibly provide a visual image of an area within a proximity of the tracking device 106.

Figure 5:
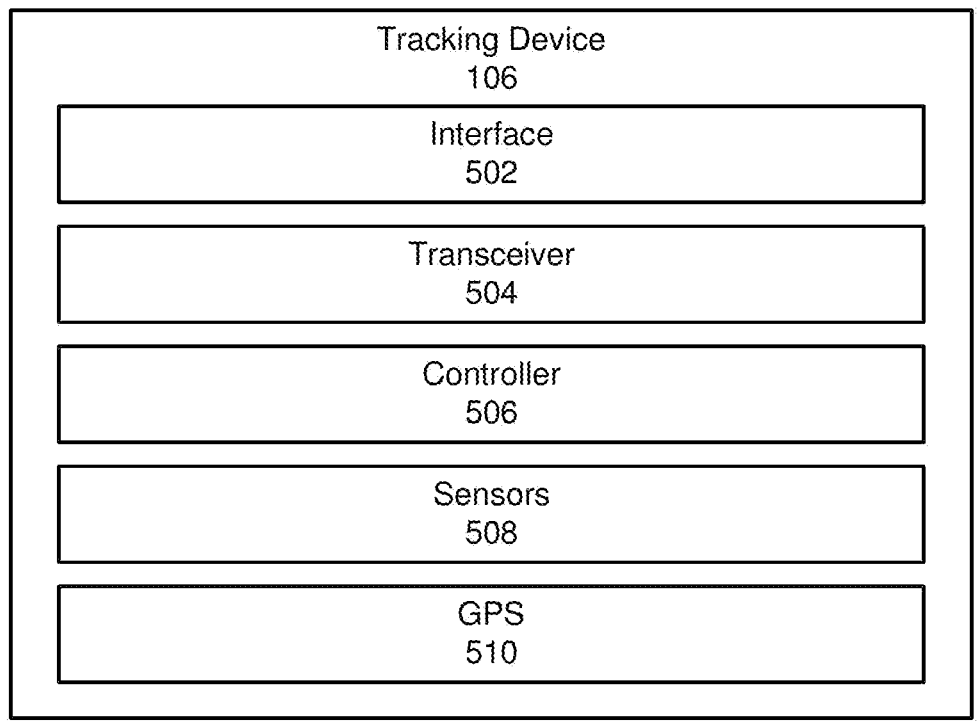
FIG. 5 illustrates an example tracking device for use in a tracking system environment, according to one embodiment.

FIG. 5 illustrates an example tracking device for use in a tracking system environment, according to one embodiment. The tracking device 106 of FIG. 5 includes an interface 502, a transceiver 504, a controller 506, one or more sensors 508, and a GPS unit 510. The transceiver 504 is a hardware circuit capable of both transmitting and receiving signals. It should be noted that in other embodiments, the tracking device 106 includes fewer, additional, or different components than those illustrated in FIG. 5. For instance, tracking devices might not include the GPS unit 510 and can still implement the functionalities described herein.

The interface 502 provides a communicative interface between the tracking device 106 and one or more other devices, such as a mobile device 102. For instance, the interface 502 can instruct the transceiver 504 to output beacon signals as described above (for example, periodically or in response to a triggering event, such as a detected movement of the tracking device 106). The interface 502 can, in response to the receiving of signals by the transceiver 504 from, for instance, the mobile device 102, manage a pairing protocol to establish a communicative connection between the tracking device 106 and the mobile device 102. As noted above, the pairing protocol can be a BLE connection, though in other embodiments, the interface 502 can manage other suitable wireless connection protocols (such as WiFi, Global System for Mobile Communications or GSM, and the like).

The controller 506 is a hardware chip that configures the tracking device 106 to perform one or more functions or to operate in one or operating modes or states. For instance, the controller 506 can configure the interval at which the transceiver broadcasts beacon signals, can authorize or prevent particular devices from pairing with the tracking device 106 based on information received from the devices and permissions stored at the tracking device, can increase or decrease the transmission strength of signals broadcasted by the transceiver, can configure the interface to emit a ringtone or flash an LED light, can enable or disable various tracking device sensors, can enable or disable a tracking device GPS unit, can enable or disable communicative functionality of the tracking device 106 (such as a GSM transmitter and receiving), can configure the tracking device into a sleep mode or awake mode, can configure the tracking device into a power saving mode, and the like. The controller 506 can configure the tracking device to perform functions or to operate in a particular operating mode based on information or signals received from a device paired with or attempting to pair with the tracking device 106, based on an operating state or connection state of the tracking device 106, based on user-selected settings, based on information stored at the tracking device 106, based on a detected location of the tracking device 106, based on historical behavior of the tracking device 106 (such as a previous length of time the tracking device was configured to operate in a particular mode), based on information received from the sensors 508 or the GPS 510, or based on any other suitable criteria. The controller 506 may selectively disable or enable features of the tracking device 106 according to instructions received from a mobile device 102 or community mobile device 104.

The sensors 508 can include motion sensors (such as gyroscopes or accelerators), altimeters, orientation sensors, proximity sensors, light sensors, or any other suitable sensor configured to detect an environment of the tracking device 106, a state of the tracking device 106, a movement or location of the tracking device 106, and the like. The sensors 508 are configured to provide information detected by the sensors to the controller 506. The GPS unit 510 is configured to detect a location of the tracking device 106 based on received GPS signals, and is configured to provide detected locations to the controller 506.

Disabling Features of Lost Tracking Device

Figure 6:
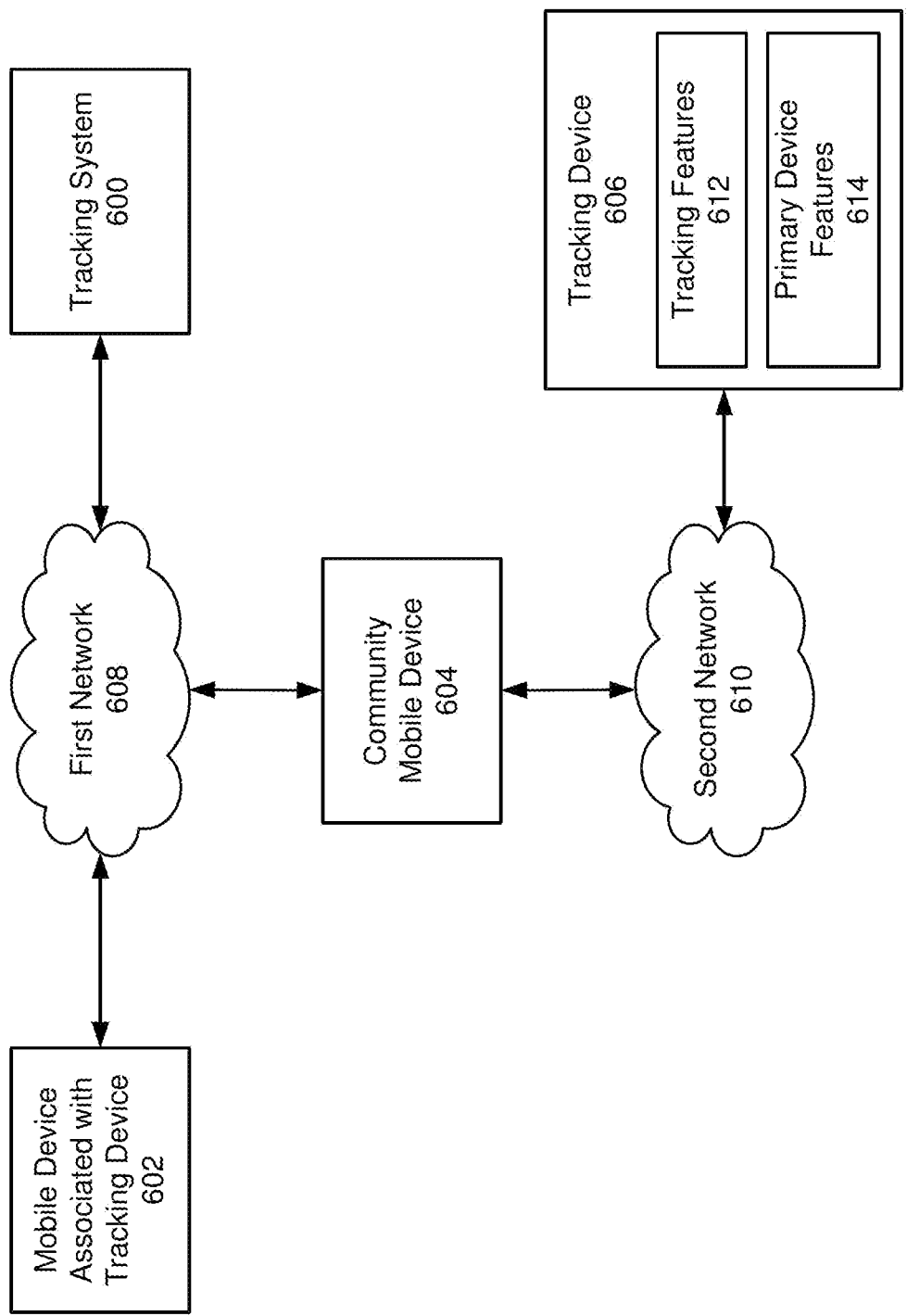
FIG. 6 illustrates an environment for disabling a feature of a tracking device, according to one embodiment.

FIG. 6 illustrates an environment for disabling a feature of a tracking device 606, according to one embodiment. The environment includes a tracking system 600, a mobile device 602 associated with the tracking device 606, a community mobile device 604, and two networks 608 and 610. The tracking system 600, mobile device 602 associated with the tracking device, community mobile device 604, first network 608, and second network 610 are similar to the tracking system 100, mobile device 102, community mobile device 104, first network 108, and second network 110 described with respect to FIGS. 1 through 4. The tracking system 600 can associate the mobile device 602 and/or a user of the mobile device 602 with the tracking device 606, e.g., using an association manager, as described above with respect to FIGS. 1 and 2.

In the embodiment shown in FIG. 6, the tracking device 606 is not a dedicated tracking device—instead, it is configured to perform one or more primary device features 614, and also includes tracking features 612. As discussed above, a tracking device can include one or more primary functions (here, the primary device features 614) and secondary tracking device functions, which are enabled by the tracking features 612. The tracking features 612 may be implemented by some or all of the components of the tracking device 106 described with respect to FIG. 5. The tracking device 606 can include one or more functional components configured to implement the primary device features 614, which are unrelated to tracking of the tracking device 606.

As an example, the tracking device 606 is a wireless speaker with primary device features 614 of receiving an input signal (e.g., a Wi-Fi or Bluetooth signal), outputting audio based on the received signal, and receiving and responding to playback commands (play, pause, stop, skip, raise or lower volume, etc.). The wireless speaker can also include tracking features 612 that allow a user to track and/or locate the wireless speaker. Certain components of the wireless speaker may be used to implement both the tracking features 612 and the primary device features 614. For example, if the wireless speaker is a Bluetooth speaker, the Bluetooth communications interface may be used both to connect to a mobile device for playing music, and to transmit beacon signals used to locate the wireless speaker.

The tracking features 612 may be implemented using a tracking device platform. For example, a tracking device provider can provide an SDK or custom chipset that, when incorporated into the tracking device 606, enable the tracking features 612. This allows the device to function as a tracking device, e.g., by communicating with other devices within the tracking device ecosystem and responding to tracking-related commands from devices within the tracking device ecosystem. If the tracking features 612 are integrated into the tracking device 606 using an SDK, the tracking device 606 may not have any special-purpose hardware included for the tracking component 612. In other embodiments, one or more hardware components, such as a communications interface or motion sensors, are included in the tracking device 606 to enable the tracking features 612, e.g., if these components are not used to implement the primary device features 614.

As described further below, the tracking features 612 may also include a feature for receiving a disabling instruction and implementing the disabling instruction in the tracking device 606. For example, the tracking features 612 may be implemented by one or more components for transmitting a tracking signal (e.g., a beacon signal), receiving an instruction to disable one of the primary device features 614, and transmitting the instruction to disable the feature to a component for implementing the primary device features 614.

If the tracking device 606 is lost, the mobile device 602, tracking system 600, and community mobile device 604 can interact with each other and with the tracking device 606 to set a lost flag in the tracking system 600 and locate the tracking device 606 as described with respect to FIGS. 1-4. In addition, the tracking system 600 may transmit an instruction to the tracking device 606, via the first network 608, community mobile device 604, and second network 610, to disable one or more features of the tracking device 606.

In one embodiment, the mobile device 602 transmits a request to disable a feature of the tracking device 606 if, for example, the user of the mobile device 602 believes that the tracking device 606 has been stolen, or is at risk of being stolen (e.g., if the user left the tracking device 606 in a public place). The disabling instruction may be an instruction to disable all primary device features 614, all tracking features 612, all primary and tracking features 612 and 614, or a single identified feature or subset of features. The instruction may depend on the abilities of the tracking device 606. For example, if the tracking device 606 is a wireless speaker or wireless headphones, the instruction may disable the tracking device 606 from pairing (e.g., via a Bluetooth connection) with a second device. Even if forming a Bluetooth connection is disabled, the tracking device 606 may still be able to use the Bluetooth communications interface of the tracking device 606 for the tracking features 612, e.g., to transmit beacon signals or receive instructions from the community mobile device 614. As another example, if the tracking device 606 is an electronic key for a car, the instruction to disable the tracking device 606 may disable all primary device features 614, e.g., features for locking, unlocking, opening the trunk, setting off the panic button, or starting the car. This would prevent a potential thief from finding or gaining access to the car.

In different embodiments, the instructions can be send from or stored at the mobile device 602, the tracking system 600, or the tracking device 606. In one embodiment, the mobile device 602 is configured to receive an explicit "disable" instruction from the user, or an instruction from the user to disable a particular identified feature or set of features. In another embodiment, the mobile device 602 generates a disable instruction in response to receiving an indication from the user that the tracking device 606 is lost; in this case, one or more parameters of the disabling instruction (e.g., which feature(s) to disable, conditions for transmitting the disabling instruction) may be locally stored on the mobile device 602 and configured by the user. In another embodiment, the tracking system 600 stores disabling instructions for a tracking device 606. When the user sets up the tracking features 612 of the tracking device 606, the user may have the option to provide one or more rules for disabling the tracking device 606 that are administered by the tracking system 600, e.g., disable primary device features 614 whenever the tracking device 606 is marked as lost, disable primary device features 614 if the tracking device 606 is lost and determined to located in a public place, disable all device features 612 and 614 if the tracking device 606 is more than a threshold distance away from the mobile device 602, etc. In other embodiments, one or more rules for disabling the tracking device 606 may be set by the tracking system 600, or may be provided to the tracking system 600 by the manufacturer of the tracking device 606. In yet another embodiment, the tracking device 606 stores instructions to disable itself if it is lost, e.g., in response to receiving a notification from the community mobile device 604 that it is lost, or in response to determining that the tracking device 606 is no longer within a communications range of the mobile device 602. These instructions may be provided by the user (e.g., when configuring the tracking device 606 directly or with the mobile device 602), by the tracking system 600, or by the manufacturer of the tracking device 606.

In some cases, the tracking device 606 only includes tracking features 612, i.e., the primary function of the tracking device 606 is for tracking. In such embodiments, the tracking features 612 can be disabled according to instructions provided by the mobile device 602 or set at the tracking system 600 or tracking device 606. In this case, disabling the tracking device 606 can prevent an unauthorized user from stealing and repurposing the tracking device 606 to track an item belonging to the unauthorized user.

In some embodiments, the tracking device 606 may have features disabled in stages. As an example, a portion of the primary device features 614 are initially disabled when the tracking device 606 is lost. If a preset length of time passes, additional features (e.g., all primary features 614, or a portion of the tracking features 612) are also disabled. Disabling features in stages may preserve battery power of the lost tracking device 606 while still allowing the user to locate the tracking device 606. If a portion of the features are disabled initially, and then the tracking device 606 is marked permanently lost by the user via the mobile device 602, or if a preset length of time has passed, all features of the tracking device 606 may be disabled. In some embodiments, the user can specify different features of the tracking device to disable. For example, if the user loses a wireless speaker, the user may first request that a feature for outputting sounds is disabled to avoid drawing attention to the lost wireless speaker. If, after a period of time, the user does not find the wireless speaker, the user may request through the mobile device 602 to disable a second feature allowing the wireless speaker to pair to other devices. This request is transmitted in a manner similar to the first request (e.g., by an instruction that passes from the mobile device 602 to the tracking system 600, to the community mobile device 604, and finally to the tracking device 606), and the wireless speaker disables the additional feature of pairing to another device.

In some embodiments, after the tracking device 606 has disabled the feature(s), the tracking device 606 re-enables the feature(s) in response to re-enable instructions provided by the mobile device 602. For example, if the mobile device 602 comes within the communication range of the tracking device 606, the mobile device 602 automatically transmits instructions to the tracking device 606 to re-enable the feature(s). Alternatively, the mobile device 602 can transmit re-enable instructions in response to a request from the user of the mobile device 602 that the tracking device 606 re-enable the feature(s). As another example, if the mobile device 602 or the user of the mobile device 602 determines that the tracking device 606 is safe (e.g., it has been recovered by a trusted community member or a friend), the mobile device 602 can transmit, automatically or in response to user input, a request for the tracking device 606 to re-enable the feature(s). If the mobile device 602 is still out of range of the mobile device 602, this request is transmitted from the mobile device 602 to the tracking system 600, which forwards the request to the community mobile device 604 (or another community mobile device), which forwards the request to the tracked device 606.

Figure 7:
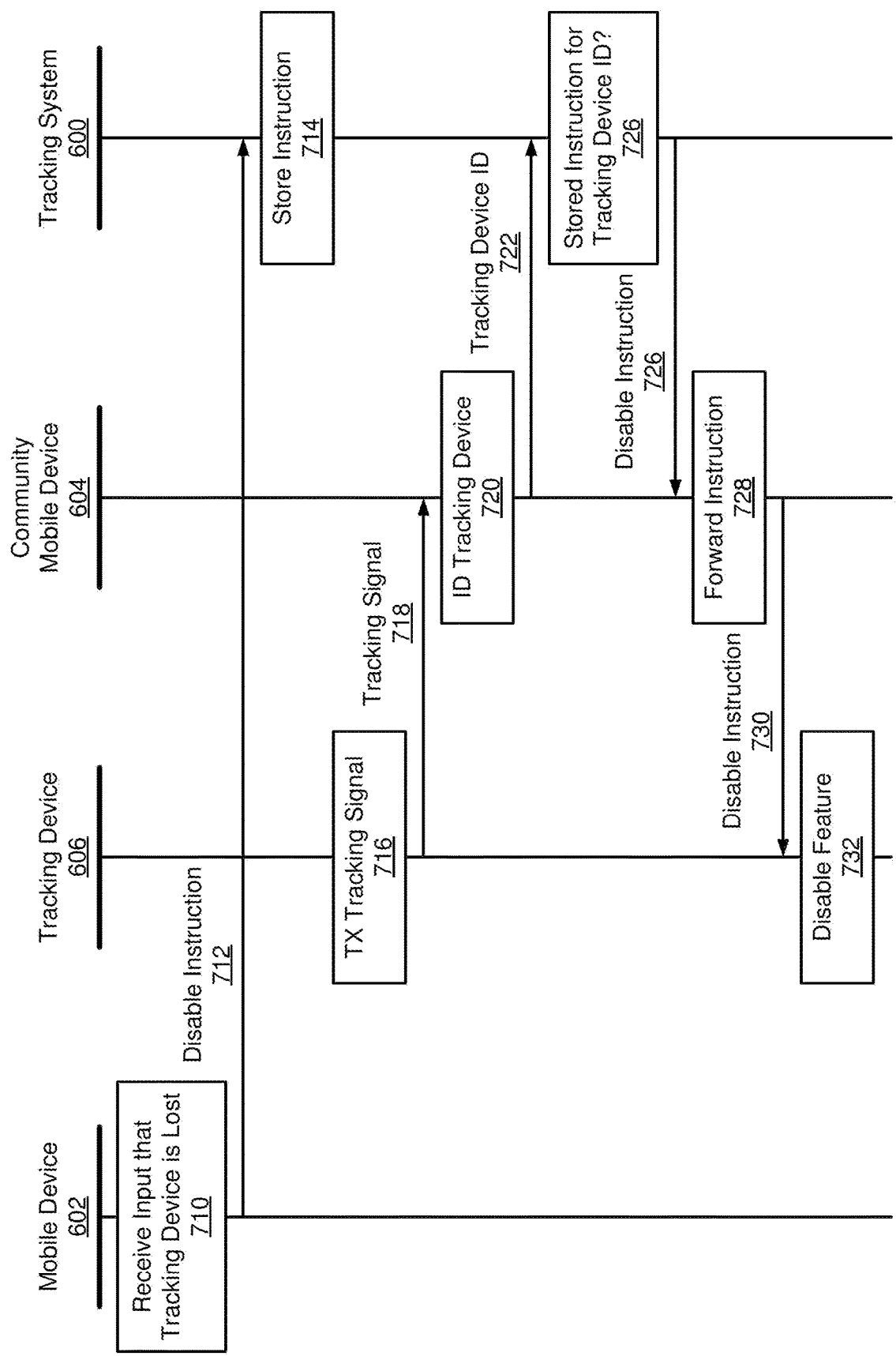
FIG. 7 is an interaction diagram illustrating a process for disabling a feature of a tracking device based on an instruction from a mobile device, according to one embodiment.

FIG. 7 is an interaction diagram illustrating an exemplary process for disabling a feature of a tracking device, according to one embodiment. The mobile device 602 receives 710 input that the tracking device 606 is lost. The input can be received from a user of the mobile device 602, e.g., if the user believes that tracking device 606 was left in a public place. As mentioned above, alternatively, the mobile device 602 may automatically determine that a tracking device 606 is lost. The input may also include an explicit request to disable the tracking device 606 or some feature(s) of the tracking device 606, as discussed above with respect to FIG. 6.

In response to the input that the tracking device 606 is lost, the mobile device 602 transmits a disable instruction 712 to the tracking system 600. The tracking system 600 stores 714 the disable instruction received from the mobile device 602.

The lost tracking device 606 transmits 716 a tracking signal 718. For example, the tracking device 606 may transmit a beacon signal at regular intervals; the tracking signal may be transmitted whether or not the tracking device 606 is lost. The tracking signal 718 is detected by the community mobile device 604, which is presently within the communications range of the tracking device 606. The community mobile device 604 can extract the identity 720 of the tracking device 606 based on the received tracking signal 718. The community mobile device 604 then transmits the tracking device identifier 722 of the tracking device 606 to the tracking system 600. In some embodiments, the community mobile device 604 may have previously received a notification from the tracking system 600 that the tracking device 606 was marked as lost.

After receiving the tracking device ID 722 from the community mobile device 604, the tracking system 600 determines that the tracking device ID 722 matches the tracking device 606 for which the disable instruction 712 is stored. The tracking system 600 then transmits the disable instruction 726 to the community mobile device 604, which forwards 728 the disable instruction 730 to the tracking device 606. In response to the disable instruction 730, the tracking device 606 disables 732 the feature(s) specified by the disable instruction 730. The tracking device 606 may transmit to the community mobile device 604 a confirmation (not shown in FIG. 6) that the disable instruction 730 was received and/or that the feature(s) have been disabled. The community mobile device 604 may forward the confirmation to the tracking system 600, which may in turn forward the confirmation to the mobile device 602.

As discussed with respect to FIG. 6, the precise instructions for disabling the tracking device 606 may be stored at the tracking system 600. In this case, instead of transmitting a disable instruction 712, the mobile device 602 simply transmits a lost indication to the tracking server 600. In response, the tracking system 600 sets a lost flag and retrieves disabling instructions for the tracking device 606, which the tracking system 600 forwards to the tracking device 606 via the community mobile device 604.

Figure 8:
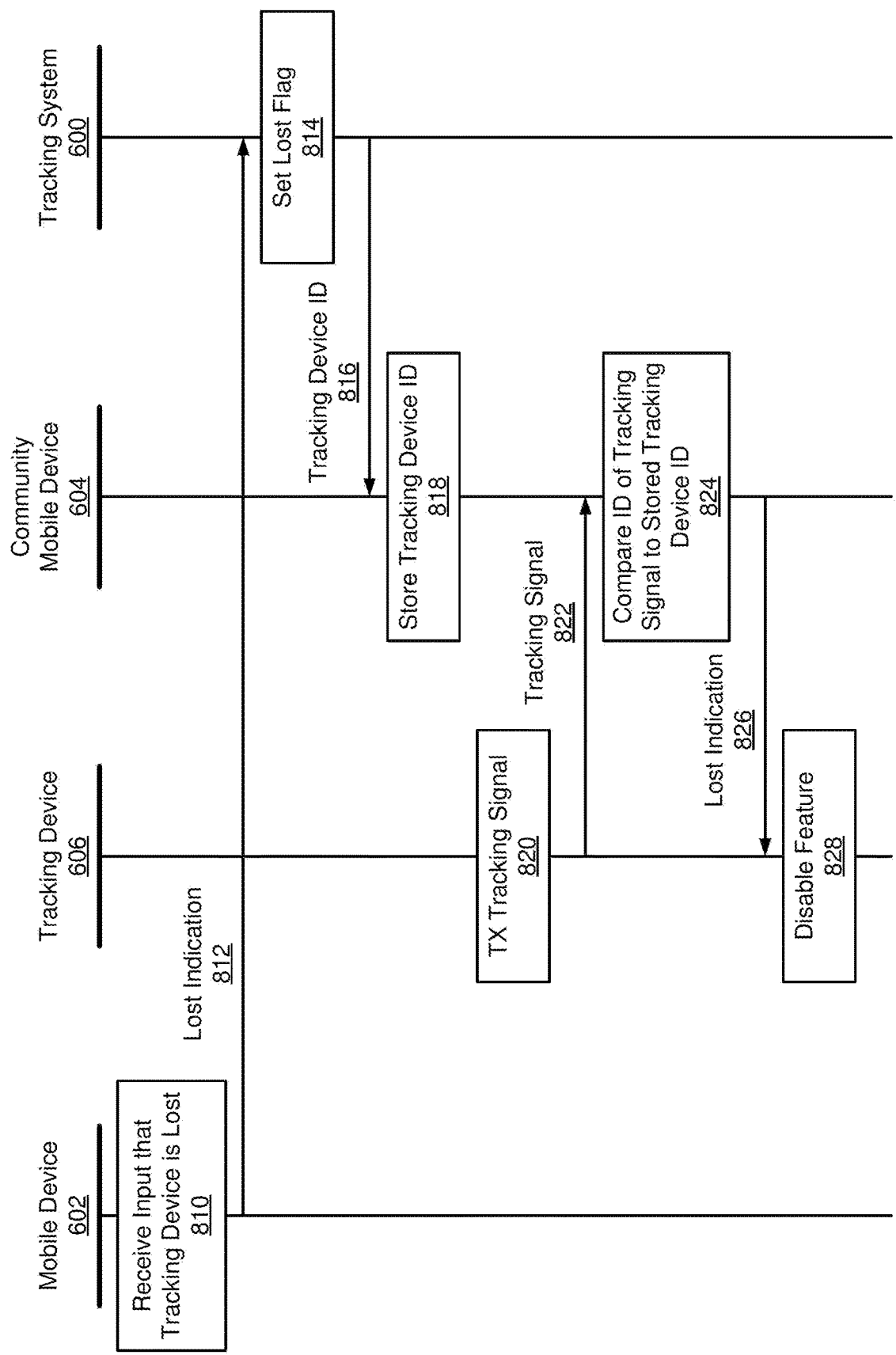
FIG. 8 is an interaction diagram illustrating a process for disabling a feature of a tracking device based on instructions stored on the tracking device, according to one embodiment.

Alternatively, as discussed with respect to FIG. 6, the instructions for disabling the tracking device 606 may be stored at the tracking device 606. As an example, the disable instructions 712, 726, and 730 may be replaced by lost indications; when the tracking device 606 receives the indication that it is lost, it automatically disables one or more features according to its stored disabling instructions. FIG. 8 is an interaction diagram illustrating another exemplary process for disabling a feature of a tracking device based on instructions stored on the tracking device.

The mobile device 602 receives 810 input that the tracking device 606 is lost. The input can be received from a user of the mobile device 602, or the mobile device 602 may automatically determine that the tracking device 606 is lost. In response to the input that the tracking device 606 is lost, the mobile device 602 transmits a lost indication 812 to the tracking system 600. The tracking system 600 sets 814 a lost flag based on the lost indication 812. The tracking system 600 also transmits a tracking device identifier 816 of the lost tracking device 606 to one or more community mobile devices, including community mobile device 604. The community mobile device 604 stores 818 the received tracking device ID so that the community mobile device 604 can scan for nearby tracking devices and identify whether any nearby tracking devices have been marked as lost.

The lost tracking device 606 transmits 820 a tracking signal 822. For example, the tracking device 606 may transmit a beacon signal at regular intervals; the tracking signal may be transmitted whether or not the tracking device 606 is lost. The tracking signal 822 is detected by the community mobile device 604, which is presently within the communications range of the tracking device 606. The community mobile device 604 can extract the identity of the tracking device 606 based on the received tracking signal 822, and compare 824 the ID of the tracking device 606 included in the tracking signal to the stored tracking device ID. If the community mobile device 604 determines that the ID of the tracking device 606 matches the ID of the tracking device flagged as lost at the tracking system 600, the community mobile device 604 transmits a lost indication 826 to the tracking device 606. This lost indication 826 alerts the tracking device 606 that it has been marked as lost.

In response to the lost indication 826, the tracking device 606 disables 828 one or more features based on instructions stored at the tracking device 606. The tracking device 606 may transmit to the community mobile device 604 a confirmation (not shown in FIG. 6) that the feature(s) have been disabled. The community mobile device 604 may forward the confirmation to the tracking system 600, which may in turn forward the confirmation to the mobile device 602.

Figure 9:
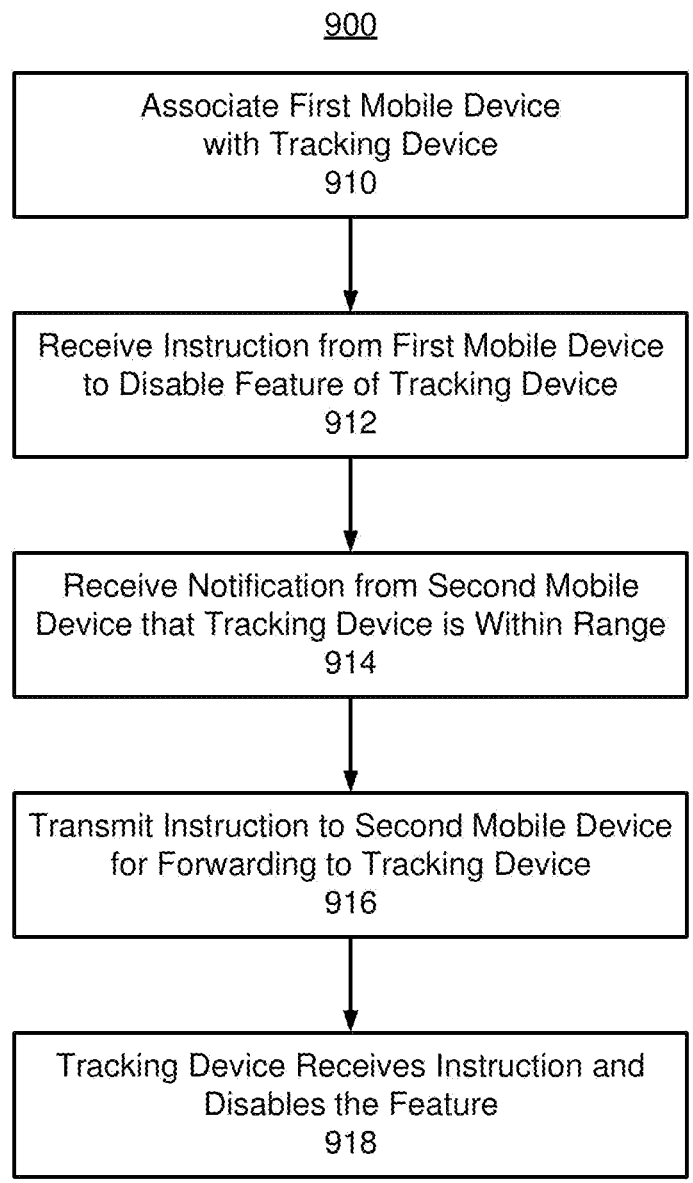
FIG. 9 is a flow chart illustrating a process for disabling a feature of a tracking device, according to one embodiment, The figures depict various embodiments of the present invention for purposes of illustration only. One skilled in the art will readily recognize from the following discussion that alternative embodiments of the structures and methods illustrated herein may be employed without departing from the principles of the invention described herein.

FIG. 9 is a flow chart illustrating a process for disabling a feature of a tracking device, according to one embodiment. In other embodiments, the process 900 may include additional steps not shown in FIG. 9, and some of the steps in the process 900 may be omitted or performed in a different order.

The tracking system 600 associates 910 a first mobile device, e.g., the mobile device 602, with a tracking device, e.g., the tracking device 606. Associating a mobile device with a tracking device at a tracking system is described in detail with respect to FIGS. 1 and 2.

The tracking system 600 receives 912 an instruction, e.g., the disable instruction 712, from the first mobile device to disable a feature of the tracking device. The tracking system 600 also receives 914 a notification from a second mobile device, e.g., the community mobile device 604, that the tracking device is within range of the second mobile device. The second mobile device may have received a beacon signal from the tracking device identifying the tracking device.

Having received both the instruction to disable the feature and the notification that the second mobile device is within range of the tracking device, the tracking system 600 transmits 916 the instruction to the second mobile device for the second mobile device to forward to the tracking device. The tracking device 606 then receives the instruction to disable the feature from the second mobile device, and in response to the instruction, disables the feature.

Although steps 910-916 of FIG. 9 are described as being performed on the tracking system 600, some or all of the steps of these steps may alternatively be performed on the mobile device 602.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an I/O interface, and a communication interface, which may be communicatively coupled by way of communication infrastructure. Additional or alternative components may be used in other embodiments. In particular embodiments, a processor includes hardware for executing computer program instructions by retrieving the instructions from an internal register, an internal cache, or other memory or storage device, and decoding and executing them. The memory can be used for storing data or instructions for execution by the processor. The memory can be any suitable storage mechanism, such as RAM, ROM, flash memory, solid state memory, and the like. The storage device can store data or computer instructions, and can include a hard disk drive, flash memory, an optical disc, or any other suitable storage device. The I/O interface allows a user to interact with the computing device, and can include a mouse, keypad, keyboard, touch screen interface, and the like. The communication interface can include hardware, software, or a combination of both, and can provide one or more interfaces for communication with other devices or entities.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for disabling a feature of a tracking device, comprising:

determining, by a tracking server, that the tracking device is lost, the tracking server configured to determine that the tracking device is lost based at least in part in response to determining that a mobile device associated with the tracking device has not communicatively coupled to the tracking device for more than a threshold amount of time, the tracking device comprising a camera with one or more camera functions and one or more wireless communication functions;

in response to determining that the tracking device is lost, disabling, by the tracking server, one or more of the camera functions of the tracking device using a disable signal sent to the tracking device via a second mobile device within a communicative range of the tracking device;

in response to a passage of a second threshold interval of time after determining that the tracking device is lost without communicatively coupling to the mobile device, disabling, by the tracking server, one or more of the wireless communication functions tracking device; and in response to subsequently communicatively coupling to the mobile device, automatically enabling, by the tracking server, all disabled camera functions and communication functions of the tracking device.

2. The method of claim 1, wherein the tracking server is further configured to determine that the tracking device is lost based on a communication received from the second mobile device in communicative range of the tracking device, the second mobile device different from the first mobile device.

3. The method of claim 2, wherein the communication from the second mobile device includes a flag indicating that the tracking device has been marked as lost by a user associated with the tracking device.

4. The method of claim 3, wherein marking the tracking device as lost comprises indicating, by the user to the tracking server that the tracking device is lost, the tracking device configured to receive information from the second mobile device indicating that the tracking device is lost.

5. The method of claim 1, wherein the tracking device comprises a software development kit (SDK) implemented within the camera.

6. The method of claim 1, wherein the threshold amount of time is selected by a user associated with the tracking device.

7. A tracking server, comprising:
a non-transitory computer-readable storage medium storing executable instructions that, when executed, cause the tracking server to perform steps comprising:
determining, by the tracking server, that the tracking device is lost, the tracking server configured to determine that the tracking device is lost based at least in part in response to determining that a mobile device associated with the tracking device has not communicatively coupled to the tracking device for more than a threshold amount of time, the tracking device comprising a camera with one or more camera functions and one or more wireless communication functions;
in response to determining that the tracking device is lost, disabling, by the tracking server, one or more of the camera functions of the tracking device using a disable signal sent to the tracking device via a second mobile device within a communicative range of the tracking device;
in response to a passage of a second threshold interval of time after determining that the tracking device is lost without communicatively coupling to the mobile device, disabling, by the tracking server, one or more of the wireless communication functions tracking device; and
in response to subsequently communicatively coupling to the mobile device, automatically enabling, by the tracking server, all disabled camera functions and communication functions of the tracking device; and
a processor configured to execute the instructions.

8. The tracking server of claim 7, wherein the tracking server is further configured to determine that the tracking device is lost based on a communication received from the second mobile device in communicative range of the tracking device, the second mobile device different from the first mobile device.

9. The tracking server of claim 8, wherein the communication from the second mobile device includes a flag indicating that the tracking device has been marked as lost by a user associated with the tracking device.

10. The tracking server of claim 9, wherein marking the tracking device as lost comprises indicating, by the user to the tracking server that the tracking device is lost, the tracking device configured to receive information from the second mobile device indicating that the tracking device is lost.

11. The tracking server of claim 7, wherein the tracking device comprises a software development kit (SDK) implemented within the camera.

12. The tracking server of claim 7, wherein the threshold amount of time is selected by a user associated with the tracking device.

13. A non-transitory computer-readable storage medium storing instructions for disabling a feature of a tracking device, the instructions, when executed by a processor of a tracking server, configured to cause the processor to perform steps comprising:
determining, by the tracking server, that the tracking device is lost, the tracking server configured to determine that the tracking device is lost based at least in part in response to determining that a mobile device associated with the tracking device has not communicatively coupled to the tracking device for more than a threshold amount of time, the tracking device comprising a camera with one or more camera functions and one or more wireless communication functions;
in response to determining that the tracking device is lost, disabling, by the tracking server, one or more of the camera functions of the tracking device using a disable signal sent to the tracking device via a second mobile device within a communicative range of the tracking device;
in response to a passage of a second threshold interval of time after determining that the tracking device is lost without communicatively coupling to the mobile device, disabling, by the tracking server, one or more of the wireless communication functions tracking device; and
in response to subsequently communicatively coupling to the mobile device, automatically enabling, by the tracking server, all disabled camera functions and communication functions of the tracking device.

14. The non-transitory computer-readable storage medium of claim 13, wherein the tracking server is further configured to determine that the tracking device is lost based on a communication received from the second mobile device in communicative range of the tracking device, the second mobile device different from the first mobile device.

15. The non-transitory computer-readable storage medium of claim 14, wherein the communication from the second mobile device includes a flag indicating that the tracking device has been marked as lost by a user associated with the tracking device.

16. The non-transitory computer-readable storage medium of claim 15, wherein marking the tracking device as lost comprises indicating, by the user to the tracking server that the tracking device is lost, the tracking device configured to receive information from the second mobile device indicating that the tracking device is lost.

17. The non-transitory computer-readable storage medium of claim 13, wherein the tracking device comprises a software development kit (SDK) implemented within the camera.

18. The non-transitory computer-readable storage medium of claim 13, wherein the threshold amount of time is selected by a user associated with the tracking device.

* * * * *